US008125304B2

(12) United States Patent
Brubaker et al.

(10) Patent No.: US 8,125,304 B2
(45) Date of Patent: Feb. 28, 2012

(54) POWER ELECTRONIC MODULE WITH AN IMPROVED CHOKE AND METHODS OF MAKING SAME

(75) Inventors: John R Brubaker, Milwaukee, WI (US); Lixiang Wei, Whitefish Bay, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 130 days.

(21) Appl. No.: 12/241,361

(22) Filed: Sep. 30, 2008

(65) Prior Publication Data

US 2010/0079230 A1 Apr. 1, 2010

(51) Int. Cl.

| | |
|---|---|
| ***H01F 27/02*** | (2006.01) |
| ***H01F 21/04*** | (2006.01) |
| ***H01F 27/28*** | (2006.01) |
| ***H01F 27/30*** | (2006.01) |
| ***H01F 27/29*** | (2006.01) |
| ***H01F 17/04*** | (2006.01) |
| ***H01F 7/06*** | (2006.01) |
| ***H02M 3/335*** | (2006.01) |
| ***H02M 5/458*** | (2006.01) |

(52) U.S. Cl. .......... 336/90; 336/128; 336/182; 336/184; 336/185; 336/192; 336/198; 336/208; 336/221; 29/602.1; 29/605; 363/16; 363/37

(58) Field of Classification Search .............. 336/55–60, 336/65, 90, 96, 145, 179, 184, 192, 198, 336/206–209; 29/602.1; 363/16, 37, 21.01, 363/141

See application file for complete search history.

(56) References Cited

U.S. PATENT DOCUMENTS

| | | | | | |
|---|---|---|---|---|---|
| 2,911,604 | A * | 11/1959 | Krause | ............................ | 336/90 |
| 3,244,960 | A * | 4/1966 | Stevens et al. | ................ | 363/126 |
| 3,328,751 | A * | 6/1967 | Massa | ........................... | 367/158 |
| 5,905,642 | A * | 5/1999 | Hammond | ...................... | 363/37 |
| 6,437,673 | B1 * | 8/2002 | Nishida et al. | .................. | 336/90 |
| 6,600,402 | B1 * | 7/2003 | LaFleur et al. | .................. | 336/61 |
| 6,950,004 | B2 * | 9/2005 | Godoy et al. | ................. | 336/160 |
| 7,034,648 | B2 * | 4/2006 | Shirahata et al. | ............. | 336/220 |
| 7,132,821 | B2 * | 11/2006 | Camara et al. | ................ | 323/315 |
| 7,593,244 | B2 * | 9/2009 | Sodo et al. | ....................... | 363/47 |
| 2006/0044103 | A1 * | 3/2006 | Roebke et al. | ................ | 336/208 |
| 2009/0066290 | A1 * | 3/2009 | Altekruse et al. | ............. | 320/108 |
| 2009/0144967 | A1 * | 6/2009 | Hasu et al. | ...................... | 29/605 |

* cited by examiner

*Primary Examiner* — Anh Mai
*Assistant Examiner* — Mangtin Lian
(74) *Attorney, Agent, or Firm* — Fletcher Yoder; Alexander R. Kuszewski; John M. Miller

(57) ABSTRACT

An improved choke assembly for a power electronics device is provided. More specifically, a choke assembly with improved protection from environmental conditions such as dirt and water is provided. An improved choke assembly may include an insulative housing for an inductor coil that seals the inductor coil from the environment.

19 Claims, 6 Drawing Sheets

POWER ELECTRONIC MODULE WITH AN IMPROVED CHOKE AND METHODS OF MAKING SAME

BACKGROUND

The invention relates generally to the field of power electronic devices such as those used in power conversion or for applying power to motors and other loads. More particularly, the invention relates to devices such as motor drives with an improved choke which provides improved protection from the environment.

In the field of power electronic devices, a wide range of circuitry is known and currently available for converting, producing and applying power to loads. Depending upon the application, such circuitry may convert incoming power from one form to another as needed by the load. In a typical arrangement, for example, constant (or varying) frequency alternating current power (such as from a utility grid or generator) is converted to controlled frequency alternating current power to drive motors, and other loads. In this type of application, the frequency and voltage of the output power can be regulated to control the speed of the motor or other device. Many other applications exist, however, for power electronic circuits that convert alternating current power to direct current power, or vice versa, or that otherwise manipulate, filter, or modify electric signals for powering a load. Circuits of this type generally include rectifiers (converters), inverters, and power conditioning circuits. For example, a motor drive will typically include a rectifier that converts AC voltage to DC. Inverter circuitry then converts the DC voltage into an AC voltage of a particular frequency desired for driving a motor at a particular speed. Often, power conditioning circuits, such as a choke and/or a bus capacitor are used to remove unwanted voltage ripple on the internal DC bus. Depending on the power load, the power conditioning circuits, such as the choke, may conduct very high levels of current and generate significant levels of heat.

To dissipate the heat generated by the circuitry of the motor drive, the motor drive unit will typically include a cooling channel that conducts cooling air through a heatsink thermally coupled to the semiconductor circuits described above. To make efficient use of the space within the motor drive unit, the choke is usually deployed within this cooling channel. Furthermore, the motor drive may be deployed such that the cooling channel is exposed outside of the equipment cabinet. Thus, the choke may be subject to dust and water.

Therefore, it may be advantageous to provide a motor drive unit with an improved choke that is protected from the environment. In particular, it may be advantageous to provide a choke with improved protection from water and dust.

BRIEF DESCRIPTION

The present invention relates generally to a choke configuration that addresses such needs. One embodiment of the present invention employs a container configured to hold an inductor coil and seal the inductor coil from the outside environment, while still allowing the inductor coil to be disposed about a magnetic core. Although the present invention is described, for convenience, in relation to a motor drive application, it will be appreciated that chokes fabricated in accordance with present techniques may be used in any choke related application, such as electrical power transmission and telecommunications, for example.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
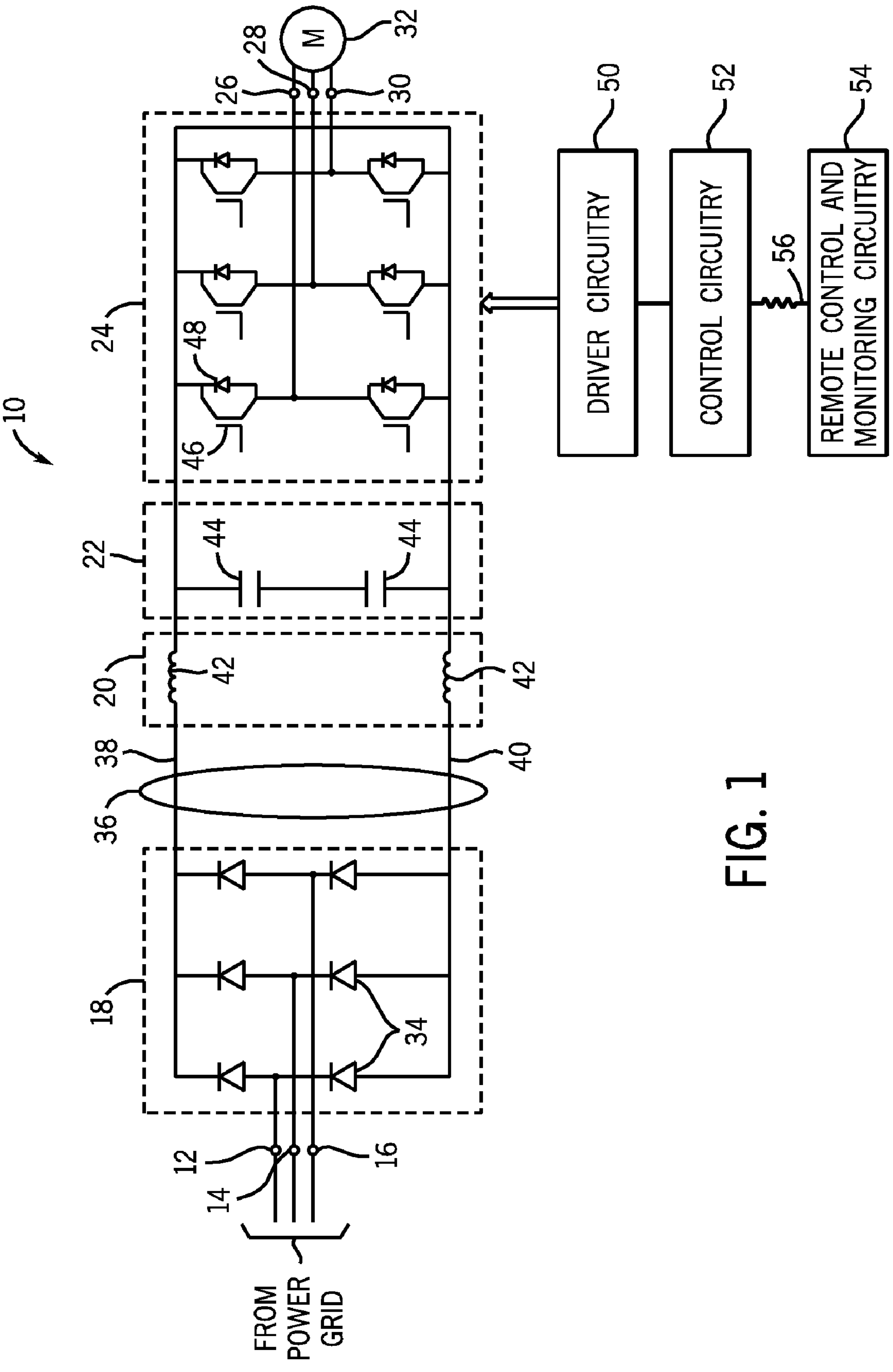
FIG. 1 is a diagrammatical representation of an exemplary motor drive circuit employing an improved choke in accordance with one embodiment of the present invention.

FIG. 1 is a diagrammatical representation of an exemplary motor drive circuit 10 employing an improved choke configuration in accordance with present embodiments. The motor drive circuit 10 includes a three phase power source electrically coupled to a set of input terminals 12, 14 and 16 that provides three phase AC power of constant frequency to a rectifier circuitry 18. In the rectifier circuitry 18, a set of six diodes 34 provide full wave rectification of the three phase voltage waveform. Each input terminal entering the rectifier circuitry 18 is coupled between two diodes 34 arranged in series, anode to cathode, which span from the high side 38 of the DC bus 36 to the low side 40 of the DC bus 36. Also coupled to the DC bus 36 is a choke 20 with improved techniques for protection from the environment that will be explained further below. The choke 20 may include inductors 42 that are coupled to either the high side 38 or the low side 40 of the DC bus 36 and serve to smooth the rectified DC voltage waveform. Capacitors 44 link the high side 38 of the DC bus 36 with the low side 40 of the DC bus 36 and are also configured to smooth the rectified DC voltage waveform. Together, the inductors 42 and capacitors 44 serve to remove most of the AC voltage ripple presented by the rectifier circuitry 18 so that the DC bus 36 carries a waveform closely approximating a true DC voltage. It should be noted that the three-phase implementation described herein is not intended to be limiting, and the invention may be employed on single-phase circuitry, as well as on circuitry designed for applications other than motor drives.

An inverter 24 is coupled to the DC bus 36 and generates a three phase output waveform at a desired frequency for driving a motor 32 connected to the output terminals 26, 28 and 30. Within the inverter 24, two switches 46 are coupled in series, collector to emitter, between the high side 38 and low side 40 of the DC bus 36. Three of these switch pairs are then coupled in parallel to the DC bus 36, for a total of six switches 46. Each switch 46 is paired with a flyback diode 48 such that the collector is coupled to the anode and the emitter is coupled to the cathode. Each of the output terminals 26, 28 and 30 is coupled to one of the switch outputs between one of the pairs of switches 46. The driver circuitry 50 signals the switches 46 to rapidly close and open, resulting in a three phase waveform output across output terminals 26, 28 and 30. The driver circuitry 50 is controlled by the control circuitry 52, which responds to the remote control and monitoring circuitry 54 through the network 56.

Figure 2:
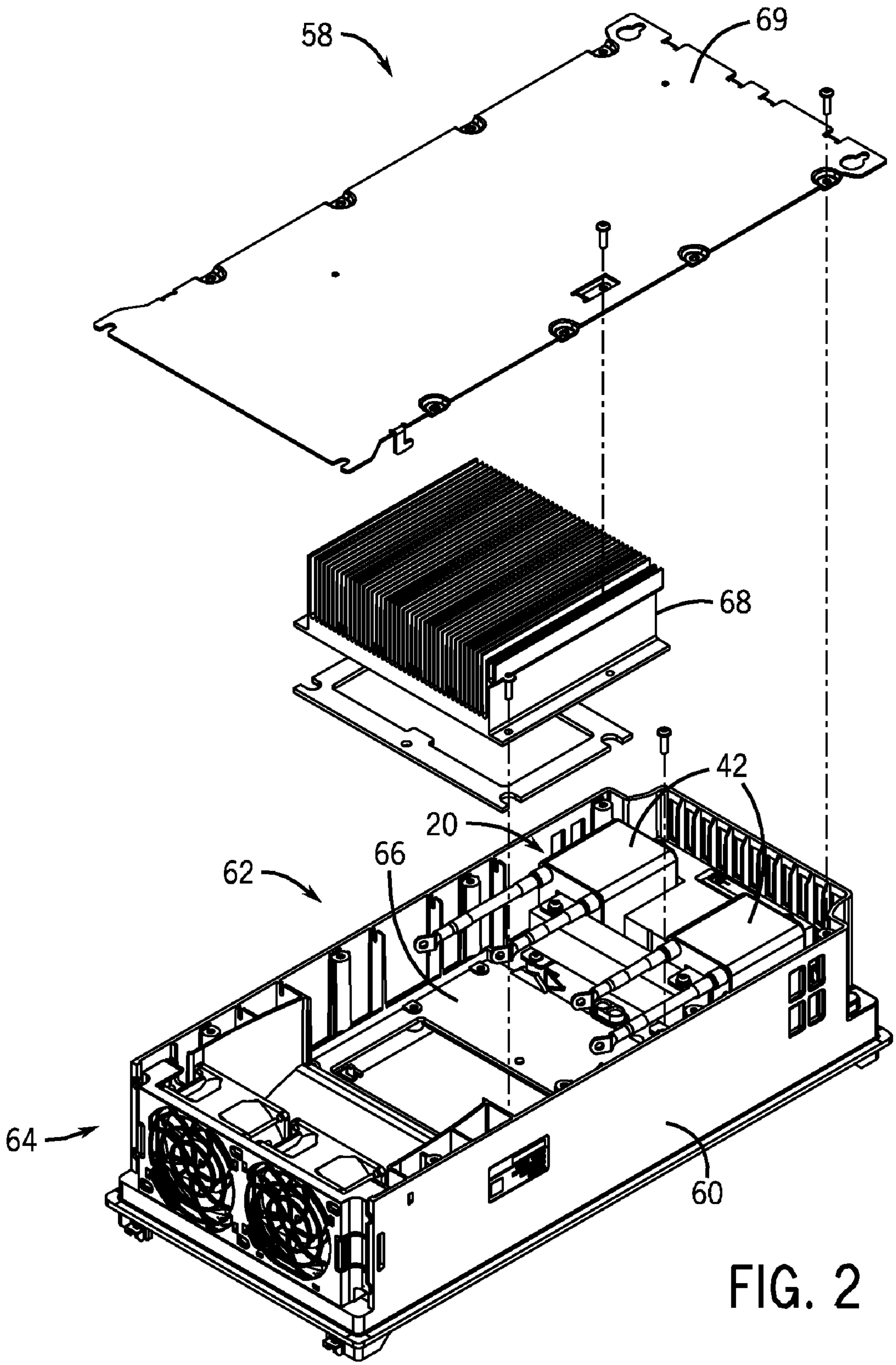
FIG. 2 is a perspective exploded view of an exemplary motor drive unit employing an improved choke in accordance with one embodiment of the present invention.

Turning to FIG. 2, a perspective view of an exemplary motor drive unit 58 employing an improved choke configuration in accordance with one embodiment is shown. Many of the circuit components depicted in FIG. 1, including the choke 20, will typically generate significant amounts of heat, which can lead to component failure due to overheating. Therefore, the motor control circuit 10 may be packaged within a unit that includes a system for enhancing the heat dissipating properties of the motor control circuit 10. Accordingly, the motor drive unit 58 may include a frame 60 that defines a cooling channel 62 which is thermally coupled to the electrical components discussed in FIG. 1. The motor drive unit 56 also includes a set of fans 64 to provide a flow of cooling air through the cooling channel 62. The switches 46, diodes 34, capacitors 44, driver circuitry 50 and controller circuitry 52 are situated adjacent to the cooling channel 58 on the opposite side of the barrier 66 from cooling channel. The barrier 66 protects the motor drive circuitry from exposure to harmful environmental conditions while allowing heat from the circuitry to pass through the barrier into the cooling channel. In this way, the flow of cool air forced through the cooling channel 62 by the fans 64 draws heat from the circuitry.

Also included in the motor drive unit 58 is a heat sink 68, which is thermally coupled to the barrier 66 inside the cooling channel 62. The fans 64 blow cooling air through the heat sink 68, thereby increasing the transfer of heat from the electrical components to the cooling air.

In some embodiments, the cooling channel may be subject to harsh environmental conditions. For example, the motor drive unit 58 may be mounted such that the front side of the motor drive unit sits inside a cabinet that provides access to the controls and electrical inputs and outputs of the drive unit 58, while the backside of the motor drive unit sits outside of the cabinet. In this case, although the circuitry on the front side of the motor drive unit is protected from the environment by the barrier 66, the cooling channel 62 is exposed to the environment. Additionally, to make efficient use of the space within the cooling channel, the choke 20 may also be situated within the cooling channel 62. Therefore, the choke will be exposed to the environment as well. Therefore, to prevent electrical failure of the choke 20, the choke 20 is sealed to provide protection against dust and water, as described below. A cover 69 may be secured over the frame 60.

Figure 3:
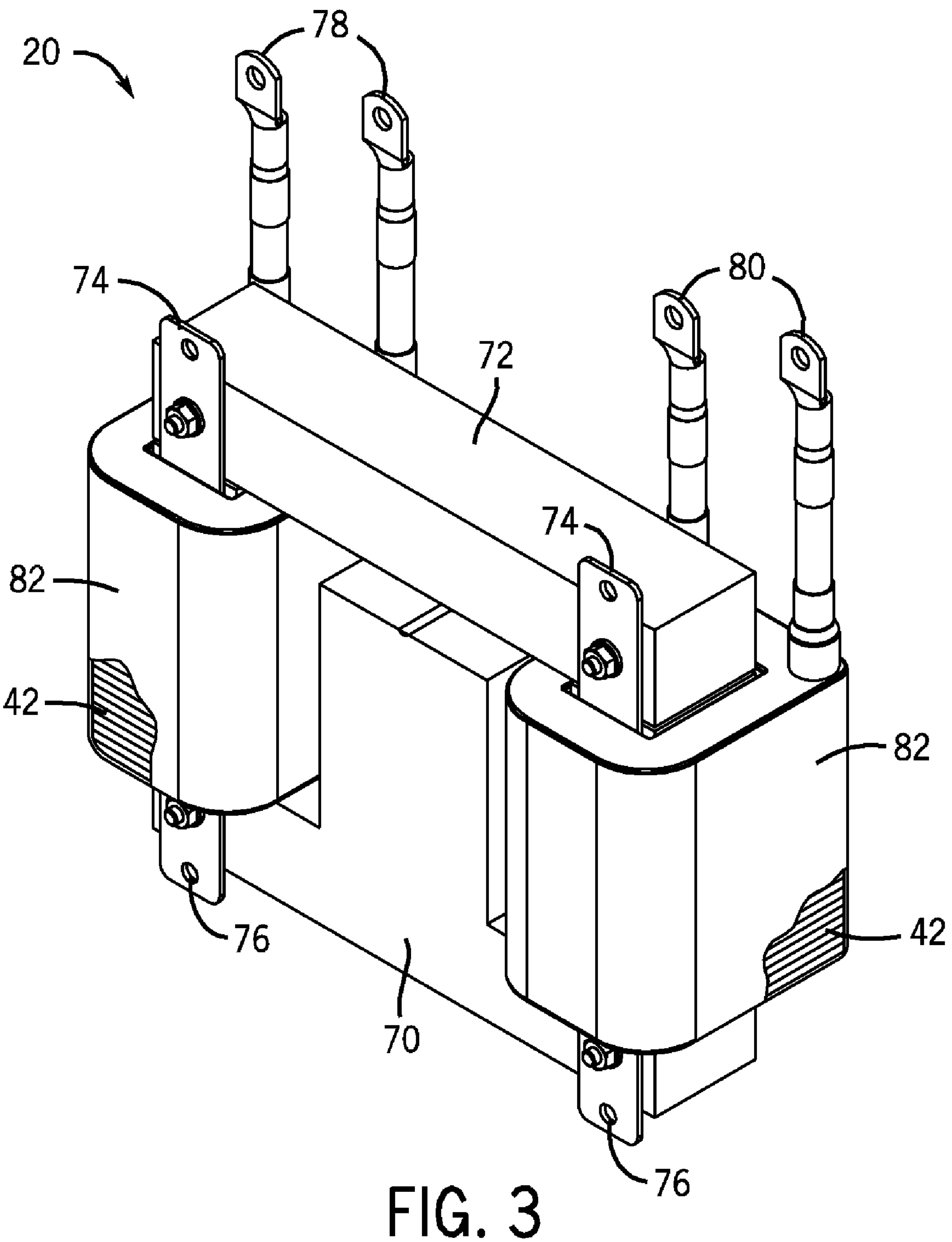
FIG. 3 is a perspective view of the improved choke shown in FIG. 2.

Turning to FIG. 3, an exemplary choke 20 that provides improved protection from the environment is shown. The choke 20 may include an E-shaped core element 70 coupled to an I-shaped core element 72 with brackets 74. The two inductor coils 42 are mounted to the outside arms of the E-shaped core element 70. Together the core elements 70 and 72 provide for inductive coupling between the inductor coils 42. The level of coupling may be determined by the spacing between the E-shaped core element 70 and the I-shaped core element 72, which may be set by the brackets 74. Additionally, brackets 74 may also include mounting holes 76 for attaching the choke to the motor drive unit 58. The choke 20 may also include the high-side bus leads 78 and the low-side bus leads 80, which couple each respective inductor 42 to the high-side 38, or the low-side 40 of the DC bus 36. As will be described further below with respect to FIG. 4, the inductor coils 42 are held within a protective container 82 that seals the inductor coils 42 from the magnetic core and outside environment. For convenience, the present application describes the use of an E-I lamination, however, this is not intended to be a limitation of the present invention, and it will be understood that other embodiments may include any suitable type of lamination shape, such as a U-I lamination, E-E lamination, and C-core lamination, for example. Furthermore, in some embodiments, the choke 20 may include one or more than two inductor coils 42. For example, a choke 20 fabricated in accordance with disclosed techniques may be deployed in a three-phase input or output line reactor.

Figure 4:
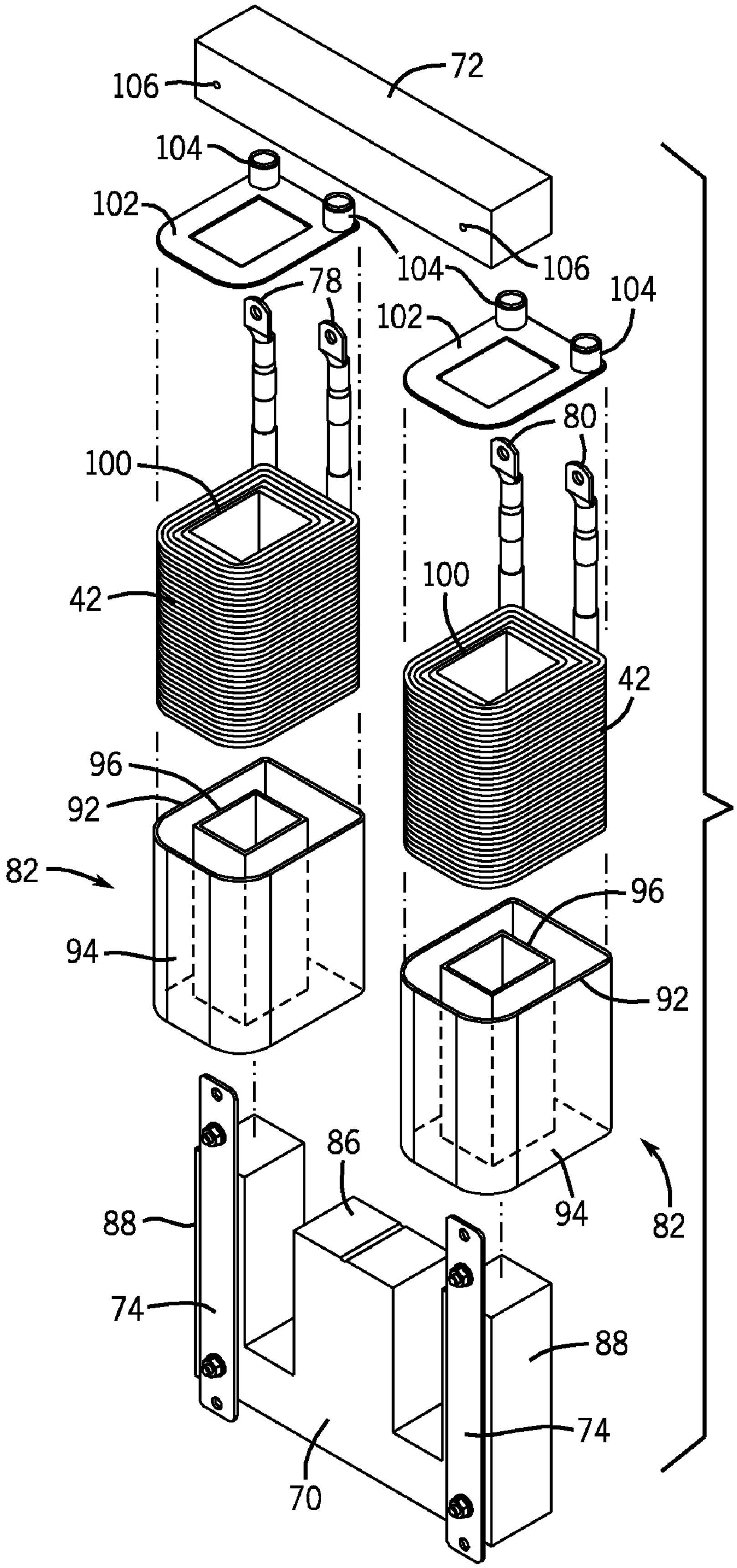
FIG. 4 is a perspective exploded view of the improved choke shown in FIG. 2 providing additional details regarding the construction of the improve choke.

Turning now to FIG. 4, an exploded perspective view of an improved choke 20 is shown in accordance with an embodiment. As can be more easily seen in FIG. 4, the E-shaped core element 70 includes a center projection 86 and two side projections 88 on which the inductor coils 42 are mounted. The container 82 is open at the top and includes side walls 92, base 94, and center member 96, which projects longitudinally from the base of the container to at least the open top of the container 82, forming a sort of donut-shaped container volume. The container 82 may form a unitary piece and may be formed from any suitable plastic or other non-conductive material. In embodiments, the cover 102 is injection molded from a polyethylene terephthalate such as Rynite®.

The inductor coils 42 may be formed with any suitable conductor, such as aluminum or copper wire or sheets. In some embodiments, inductor coils 42 may be formed by winding the conductor around a bobbin 100. Furthermore, the conductor may be insulated to prevent the loops of conductor from shorting to each other. The diameter of the inductor coils 42 and the number of windings of the conductor will, in part, determine the inductance of the choke. The gauge of the wire or thickness of the sheet will determine the power handling. The bobbin 100 may be made of any suitable plastic or other non-conductor and may be dimensioned to fit over the center member 96. The high-side bus leads 78 and low-side bus leads 80 are electrically coupled to the respective ends of the inductor coils 42, as will be described further below, with respect to FIG. 5. The assembled inductor coils 42 are positioned within the container 82 around the center member 96.

On top of the container 82 is a cover 102 that seals the inductor coils 42 inside the container 82. As with the container 82, the cover 102 may be formed from any suitable plastic or other non-conductor. In embodiments, the cover 102 is injection molded from polyethylene terephthalate. The cover may provide openings 104 which allow the bus leads 78 and 80 to pass through the cover 102. In some embodiments, the openings 104 may be raised cylindrical openings configured to provide a pressure seal against the leads 78, 80 and provide a surface over additional protection may be applied, as will be described further below, with respect to FIG. 5. In some embodiments, the container 82 may be filled with a potting material to provide additional environmental protection as well as thermal conductivity.

Over the cover 102 is the I-shaped core element 72, which is coupled to the E-shaped core element 70 via the mounting holes 76. The I-shaped core element completes the magnetic circuit between the two inductor coils 42, providing a desired level of mutual inductance between the inductors 42. Furthermore, the mutual inductance may be adjusted by controlling the air gap between the E-shaped core element 70 and the I-shaped core element 72. The air gap is controlled by the length of the bracket 74. As with the E-shaped core element, the I-shaped core element may include any form of magnetic material, such a ferromagnetic material. The I-shaped core element 72 may be held in position on the brackets 74 via fasteners (not shown) received in the apertures 106 of the I-shaped core element 72.

Figure 5:
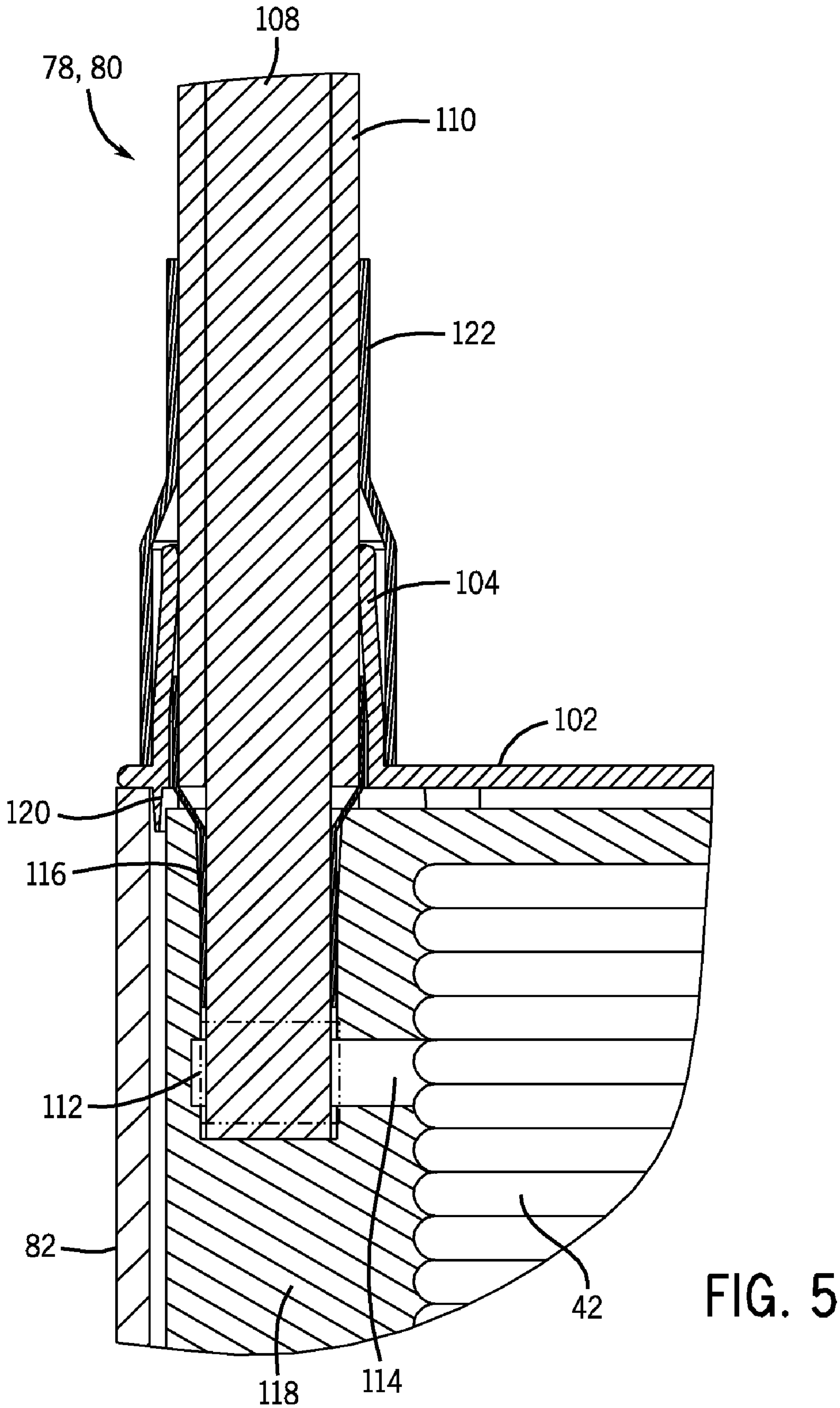
FIG. 5 is a cross section of an exemplary inductor coil shown in FIG. 4 providing additional details regarding the construction of the improved choke.

Turning now to FIG. 5, a partial cross-section of the assembled inductor coil 42 of FIG. 4 is shown. As shown in FIG. 5, the bus leads 78 and 80 include electrical conductors 108 surrounded by an insulator 110. The bus leads 78 and 80 project from the container 82 through the raised cylindrical openings 104, which may be tapered to provide pressure against the insulator 110. At the end of the conductor 108 inside the container 82, the insulator 110 is stripped from the conductor 108 and the conductor 108 is electrically coupled to the inductor coil 42 by any suitable method, such as soldering, for example. In the embodiment shown, inductor coil lead 114 is crimped and soldered to the conductor 108 at the connection point 112. Additionally, where the insulator 110 is stripped from the conductor 108, the bus lead may be wrapped with electrical tape 116 to provide additional protection.

As stated above, the container 82 may be filled with a potting material 118, such as an epoxy or other resin, which seals and electrically insulates the inductor coil 42 from the outside environment. Because the potting material 118 is more thermally conductive than air, the potting material 118 increases the transfer of heat away from the inductor coil 42. Moreover, because the container 82 provides mechanical rigidity, the container 82 enables the use of a thin wall of potting material 118, which also serves to increase the transfer of heat away from the inductor coil 42. Increasing the transfer of heat away from the inductor coil 42 enables the use of a smaller gauge conductor, thereby reducing the weight, size, and cost of the inductor coil 42. Additionally, the potting material 118 also reduces the likelihood of electrical failure of the inductor coil 42 by reducing mechanical vibration of the inductor coil 42.

The potting material 118 also fastens the cover 102 to the container 82. The cover 102 may include a lip 120 that allows the cover 102 to fit or snap into the container 82, ensuring the proper alignment between the container 82 and the cover 102 and increasing the strength of the seal between the container 82 and the cover 102. Additionally, a section of shrink tubing 122 may be placed around the bus lead 78 at the cylindrical opening 104.

Figure 6:
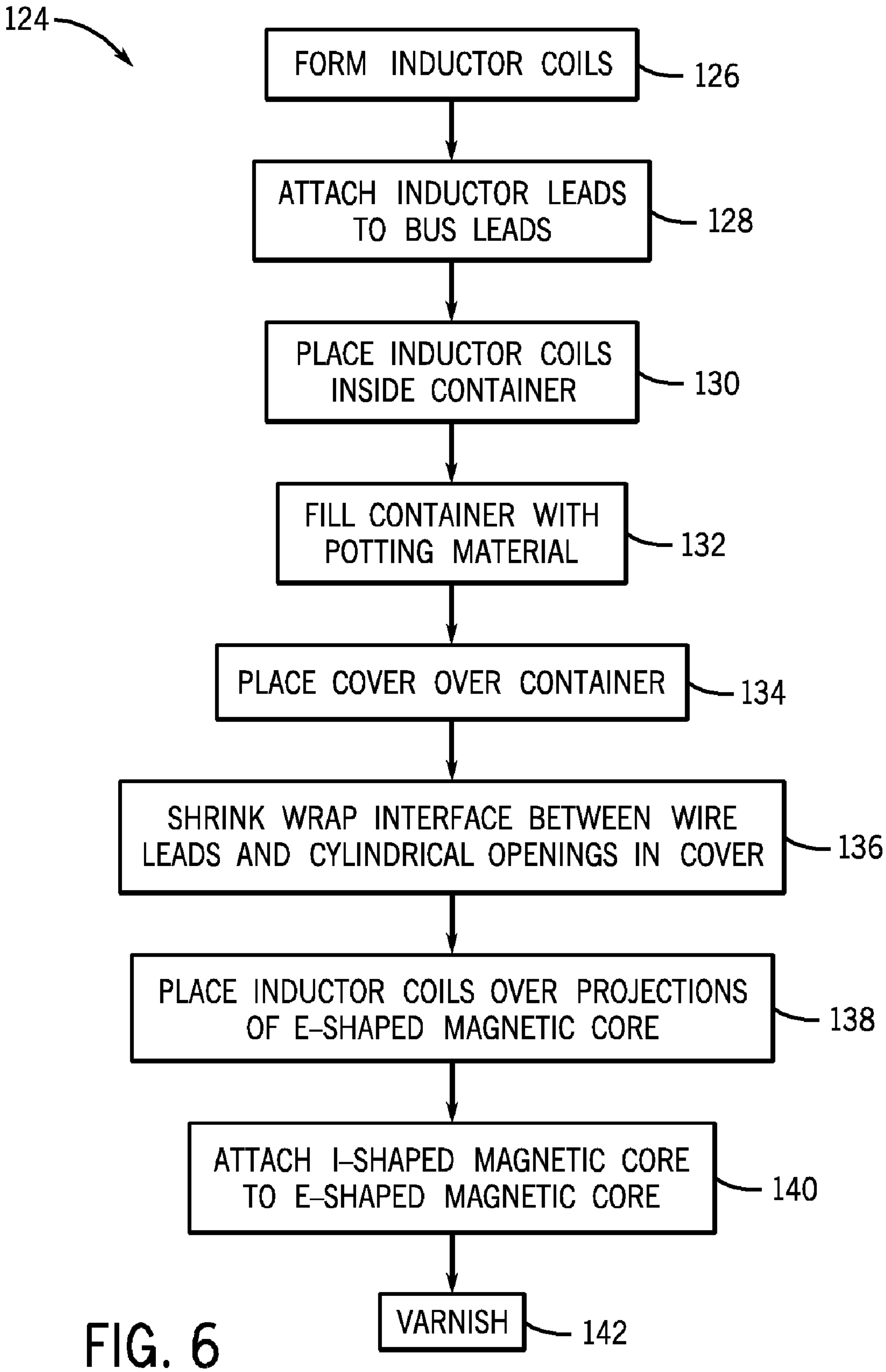
FIG. 6 is a flow chart of an exemplary method of fabricating the improved choke in accordance with certain embodiments of the invention.

Turning now to FIG. 6, a method of fabricating the choke assembly illustrated in FIG. 4 is illustrated. Process 124 begins at step 126, in which the inductor coil 42 is formed by shaping a conductor into the form of an inductor coil 42. In some embodiments, the conductor may be shaped by winding the conductor around a bobbin 100, however, in other embodiments, the conductor may be shaped without the use of a bobbin. Next, at step 128, the inductor leads 114 are coupled to the bus leads, i.e. conductor 108. The coupling between the inductor lead 114 and the conductor 108 may be accomplished by any suitable method such as soldering, crimping, and/or the use of mechanical fasteners. Next, at step 130, the inductor coil 42 is placed inside the container 82. In embodiments wherein the inductor coil 42 is formed around the bobbin 100, the bobbin 100 may be removed from the inductor coil 42 before being placed inside the container 82. Additionally, in some embodiments, the bobbin 100 may remain in place and slide over the projection 96. Next at step 132, the container 82 may optionally be filled with an epoxy, resin, varnish or other potting material. Next, at step 134, the cover 102 is placed over the container 82 before the epoxy cures. During this step, the bus leads 78 and 80 are passed through the openings 104. Next, at step 136, shrink tubing may optionally be positioned around bus leads 78 and 80 at the interface between the bus leads 78 and 80 and the openings 104, and the shrink tubing may be heated to form a seal between the openings 104 and the bus leads 78 and 80. Next, at step 138, the inductor coils 42 inside the containers 94 may be installed over the side projections 88 of the E-shaped core element 70 and the brackets 74. Next, at step 140, the I-shaped core element may be attached to the E-shaped core element 70. The spacing between the I-shaped core element 72 and the E-shaped core element 70 may be predetermined according to known inductive characteristics of such chokes. Finally, at step 142 the choke assembly may, in some embodiments, be covered with a layer of varnish. The varnish may provide an additional level of protection against dust and water, protection against corrosion, and may also serve to securely fasten the inductor coil 42 to the core element 70, thereby minimizing vibrations. The choke 20 may then be installed within the motor drive unit 58.

With the choke arrangement described above, significant protection from environmental conditions can be realized. The cup-and-bobbin style container seals electrical conductors against water and dust, protecting against electrical failure and increasing the overall safety of the device. Furthermore, chokes fabricated in accordance with disclosed techniques are easy to assemble and, therefore, cost effective. Sealing the container 82 with epoxy provides a double layer of protection and durability, and also enhances the thermal conductivity of the assembly, allowing heat to pass efficiently from the inductor coil 42 to the outside environment. Additional features, such as the cylindrical openings 104 and the shrink tubing 122 provide additional measures of protection. By providing a choke with significant protection against dust and water, the motor drive unit 58 may be mounted such that the cooling channel 62 is exposed to the environment outside of the mounting cabinet.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive comprising:

rectifier circuitry coupled to an AC power source and configured to provide power to a DC bus;

inverter circuitry coupled to the DC bus and configured to generate drive signals for driving a motor;

a choke assembly coupled to the DC bus and comprising:

a bobbin;

a preformed inductor coil wound around the bobbin;

a preformed insulative container comprising an outer wall, an integral base and a hollow projection extending from the base of the container and creating an internal space between the wall of the container and the projection, the bobbin fitting over the hollow projection and the space configured to receive the inductor coil on the bobbin, the projection forming a passageway through the container;

an annular cover disposed over the container and configured to seal the inductor coil inside the container;

an E-shaped magnetic core having a center projection and two side projections, wherein the container, coil and cover are disposed over one of the side projections; and an I-shaped core disposed over the annular cover.

2. The motor drive of claim 1, wherein the choke assembly comprises a potting material disposed in the internal space of the preformed insulative container around the inductor coil.

3. The motor drive of claim 1, wherein the cover comprises an opening configured to allow an insulated wire lead to pass though the cover, and a raised portion around the opening for receiving a protective tubing between the raised portion and the insulated wire lead.

4. The motor drive of claim 3, wherein the raised portion is tapered to provide compression of the insulated wire lead.

5. The motor drive of claim 1, comprising a layer of varnish surrounding the choke assembly and filling a void between the magnetic core and the container.

6. The motor drive of claim 1, wherein the choke assembly is disposed within a cooling channel formed in the motor drive.

7. The motor drive of claim 1, wherein the choke assembly comprises at least two inductor coils, one of the conductor coils being coupled to a high side of the DC bus, and another of the conductor coils coupled to a low side of the DC bus.

8. A choke assembly, comprising:

a bobbin;

a preformed insulated electrical conductor wound around the bobbin, the preformed insulated electrical conductor configured to induce a magnetic field in a magnetic core; and a preformed electrically insulative container including an outer wall, an integral base, and a hollow projection extending from the base of the container, the bobbin of the preformed electrical conductor surrounding the hollow projection, the hollow projection separating the electrical conductor from the magnetic core.

9. The choke assembly of claim 8, comprising a potting material disposed inside the preformed electrically insulative container and surrounding the insulated electrical conductor.

10. The choke assembly of claim 8, wherein the potting material is configured to increase the transfer of heat from the insulated electrical conductor.

11. The choke assembly of claim 8, comprising a cover disposed over the preformed electrically insulative container, the cover comprising openings for leads electrically coupled to the insulated electrical conductor.

12. The choke assembly of claim 8, wherein the magnetic core is configured to provide an E-I lamination, U-I lamination, E-E lamination, or a C-core lamination.

13. A motor drive comprising:

rectifier circuitry coupled to an AC power source and configured to provide power to a DC bus;

inverter circuitry coupled to the DC bus and configured to generate drive signals for driving a motor;

a choke assembly coupled to the DC bus and including:

two distinct core assemblies including:

two bobbins;

two preformed inductor coils, each inductor coil wound around one of the two bobbins;

two preformed insulative containers each including an outer wall, an integral base and a hollow projection extending from the base of the container and creating an internal space between the wall of the container and the projection, the bobbin fitting over the hollow projection and the space configured to receive the preformed inductor coil on the bobbin, the projection forming a passageway through the container;

two annular covers disposed over the containers and configured to seal the inductor coils inside the containers;

an E-shaped magnetic core having a center projection and two side projections, wherein each of the containers, coils and covers are disposed over a respective side projection; and an I-shaped core disposed over the two annular covers.

14. The motor drive of claim 13, wherein the choke assembly comprises a potting material disposed in the internal space of the preformed insulative container around the inductor coil.

15. The motor drive of claim 13, wherein the choke assembly comprises the bobbins disposed over the projections and configured to retain the inductor coils.

16. The motor drive of claim 13, wherein the cover comprises an opening configured to allow an insulated wire lead to pass though the cover, and a raised portion around the opening for receiving a protective tubing between the raised portion and the insulated wire lead.

17. The motor drive of claim 16, wherein the raised portion is tapered to provide compression of the insulated wire lead.

18. The motor drive of claim 16, including a layer of varnish surrounding the choke assembly and filling a void between the magnetic core and the container.

19. The motor drive of claim 16, wherein the core assemblies are held between the E-shaped core and the I-shaped core by a pair of brackets.

* * * * *